INVENTOR.
MONTE I. BURGETT, JR.
BY
Robert D. Sanborn
ATTORNEY

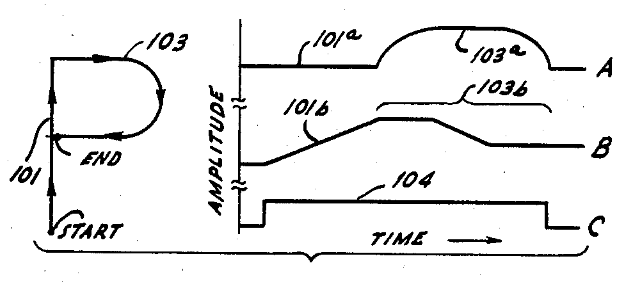
FIG. 4
FIG. 5A.
FIG. 5.
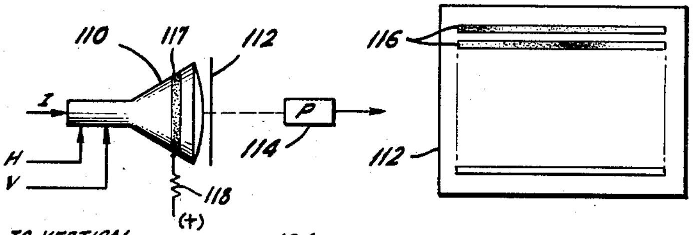
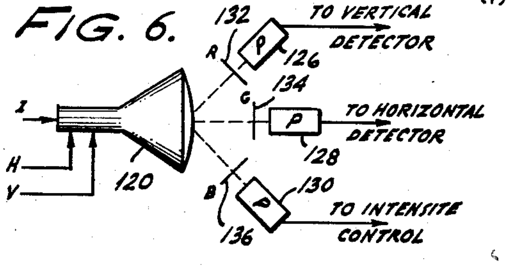
FIG. 6.
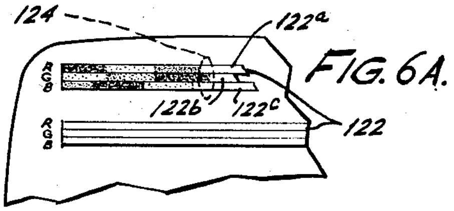
FIG. 6A.
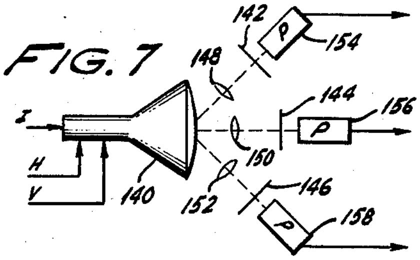
FIG. 7
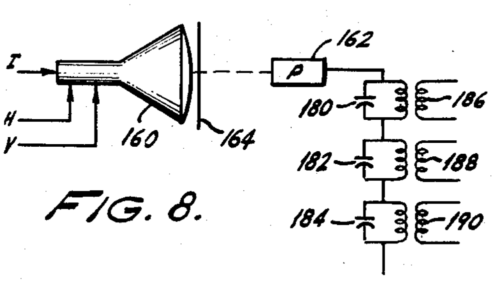
FIG. 8.
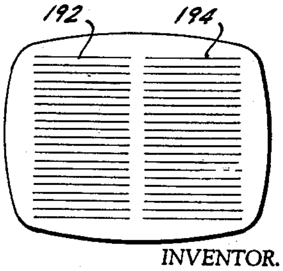
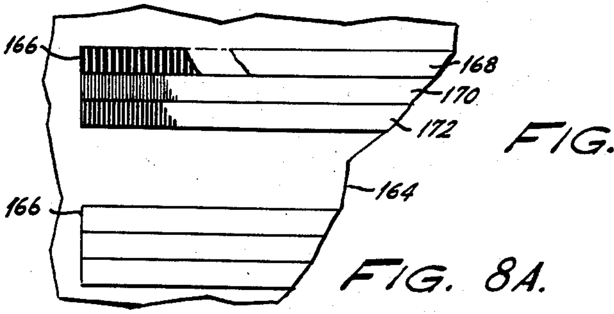
FIG. 9. FIG. 8A.
INVENTOR.
MONTE I. BURGETT JR.
BY
Robert D. Sanborn
ATTORNEY United States Patent Office 2,931,936

Patented Apr. 5, 1960

2,931,936

CHARACTER GENERATING MEANS FOR ELECTRONIC INFORMATION DISPLAY SYSTEMS

Monte I. Burgett, Jr., Philadelphia, Pa., assignor to Philco Corporation, Philadelphia, Pa., a corporation of Pennsylvania Application December 8, 1958, Serial No. 778,937

20 Claims. (Cl. 315—8.6)

The present invention relates to electronic information display systems and more particularly to a system for electronically generating identifying characters for electronic information display systems such as cathode ray tube display systems.

Control centers such as air traffic control centers, harbor control centers, missile control centers, etc. frequently employ very large size cathode ray tube displays showing the position of all moving objects within the area which is under the jurisdiction of the center. The position information may be supplied by one or more scanning radar systems. Automatic tracking target identifying circuits are known which will cause an electronically generated indication, such as a spot of light, to follow the movement of a target indication on the screen of the indicator once the indication has been moved into coincidence with the selected target indication. Symbol generating systems are known which will operate in conjunction with the automatic tracking target identifying system to cause the indication which follows the target to have the shape of an identifying symbol such as one or more alpha-numeric characters or a symbol of arbitrary shape. This is usually accomplished by employing a display tube having a long persistence screen and applying target identification data to the display tube in the short interval between successive target display scans, or some other time sharing basis. One identifying symbol may represent inbound vehicles, another outbound vehicles. Alternatively, the symbols may show the targets which have been assigned to certain tracking radar systems or designated controllers. In a large control center each target may require as many as 10 arbitrarily selected symbols for identification. Ten or more targets may be identified in this manner at one time. Single beam cathode ray display tubes are preferred over multiple beam cathode ray tubes because of their simplicity. If a single beam cathode ray tube is employed as the display tube the one hundred or more arbitrarily selected characters which may be employed in a large display system must be written in succession within a period of a small fraction of a millisecond. This requires a very high speed, completely asynchronous character generator circuit. For large display systems many different types of symbols must be available at will to meet the needs of all possible situations which may arise.

Very high speed character generators are also required for displaying the output data of a computer in tabular form. Information may be supplied from a high speed computer at the rate of a million or more characters per second. A read out device which can write characters at this rate makes it unnecessary to employ the complex speed matching circuits, i.e. temporary information storage circuits with fast read-in and slow read-out, now required in computer circuits. The characters written at high speed may be arranged in tabular form with 10,000 or more characters per page. A photographic or other similar process may be employed to make a permanent record of the characters written at this high speed. Alternatively, the characters may be written in succession at a single location and the characters recorded by a moving photographic or xerographic tape. Again the information read-out systems mentioned above require very high speed, completely asynchronous character generator circuits.

The present invention is concerned only with symbol generating systems per se which may be incorporated in automatic target tracking systems and computer read-out systems of the types mentioned and in any other systems requiring the electronic generation of symbols which are selectable at will. The automatic tracking target identifying circuits and computer systems per se mentioned above form no part of the present invention and for this reason will not be described in detail.

Prior art symbol generating systems are complex, expensive and relatively inflexible in their operation. For example, one system which has been employed in the past requires a separate electron gun and a special character forming plate having openings formed therein in the shape of the symbol to be displayed. The electron beam from the separate gun is extruded through a selected one of the shaped openings in the character forming plate. The extruded beam is then deflected so that it impinges on the viewing screen in the vicinity of the selected target indication. This system is quite expensive, fairly slow in its operation and provides only a limited character selection. The characters available can be changed only by changing the entire display tube since the character forming plate is within the evacuated envelope of the display tube. Modifications of this system have been proposed which employ a symbol generating tube which is separate from the display tube and an optical system for projecting the selected symbols onto the screen of the display tube. This permits the replacement of the symbol generating tube without replacing the large and very expensive display tube itself but the optical projection system is expensive and not entirely satisfactory for many reasons. This system is subject to the further disadvantage that only a relatively small portion of the beam passes through the mask. Therefore very high beam currents are required to form a readable symbol on the display tube.

Other symbol generating systems have been proposed which utilize the normal writing beam of the display tube on a time sharing basis to write symbols at selected points on the display tube screen. In systems of this type, the horizontal and vertical deflection signals and the intensity modulation signal required to generate a desired symbol are synthesized by special circuits provided for that purpose. One typical circuit includes sine wave generators, phase shifters, clippers, adders and other circuit elements necessary to synthesize the necessary deflection and intensity modulation signals from a series of sinusoidal waveforms. The undesirable complexity of such a system is obvious from the mere enumeration of the circuit components required therein.

Another synthesizing circuit which employs the normal writing beam of the display tube employs a magnetic storage matrix to store digital information on the position of a series of dots which outline the selected symbol if read out in the proper sequence and supplied to the display tube deflection circuits. This last system has rather poor character legibility and requires a relatively large amount of equipment and a long time to complete a symbol.

Electromechanical systems for generating the horizontal and vertical deflection voltages necessary to generate a symbol have also been proposed. In general, these systems employ a light source and a photocell separated by a rotatable mask. Different sectors of the mask have different densities so that a variable output voltage is obtained from the photocell as the mask is rotated. These systems are relatively very slow in their operation and somewhat limited in the symbol selection available. They also require a relatively large amount of maintenance to keep them in proper operating condition. The use of the rotating mask definitely limits the maximum speed at which a character may be written and makes the system periodic in its operation. A character can be initiated only when the mask is in a certain position. Much valuable writing time may be lost in waiting for the mask to reach that position.

Therefore it is an object of the present invention to provide a simple, reliable, high speed symbol generating system for electronic information display systems such as cathode ray tube display systems.

Another object of this invention is to provide a character generation circuit which is completely asynchronous in its operation.

It is a further object of the present invention to provide a symbol generating system for electronic information display systems which requires no moving parts.

Still another object of the present invention is to provide a symbol generating system for electronic information display systems which is flexible in its operation and provides a large selection of symbols.

An additional object of the present invention is to provide a symbol generating system for electronic information display systems which does not require complex waveshaping circuits.

A further object of the invention is to provide a symbol generating system for electronic information display systems such as cathode ray tube display systems which is readily usable with automatic tracking target identifying system.

These and other objects of the present invention are achieved by providing a system which comprises one or more symbol generating tubes of the cathode ray type, each of which is provided with a plurality of selectable beam traceable tracks or track groups individually representative of one or more signal components, such as the horizontal deflection component, vertical deflection component, etc., of a symbol. The beam traceable track comprises means including the screen of the symbol generating tube which is responsive to the impingement thereon of a cathode ray beam for generating an electrical signal. The amplitude response of each track to a cathode ray beam of selected intensity varies from point to point along each track in accordance with the desired variation in amplitude of a selected component signal of the symbol to be generated. Each symbol generating cathode ray tube is provided with means for generating a cathode ray beam, for deflecting the beam to coincide with a selected one of the beam traceable tracks, and for deflecting the cathode ray beam along the selected track. It will become apparent as the description of the invention proceeds that the present invention is capable of reproducing characters with great fidelity, even to the point of reproducing the individual characteristics of handwritten script. It will also become apparent that the present invention is completely asynchronous in its operation thus making it possible to make maximum use of all available writing time. This permits a larger number of symbols of greater brightness to be written during a given writing interval. High character writing speed and asynchronous operation are achieved in part through the use of a substantially inertialess system which requires no switching of the symbol information signals per se.

For a better understanding of the present invention together with other and further objects thereof reference should now be made to the following detailed description which is to be read in conjunction with the accompanying drawings in which:

Fig. 4 is a diagram showing the letter P and the cathode ray tube control voltages which are necessary to synthesize this character;

Fig. 5 is a diagrammatic showing of a modified symbol generating tube employing a uniform phosphor screen and a variable density mask which has the beam traceable tracks formed thereon.

Fig. 5A is a front view of the mask of Fig. 5;

Fig. 6 is a diagrammatic view showing means for deriving three separate component signals from a single symbol generating tube;

Fig. 6A is an enlarged fragmentary view of a portion of the screen structure of the system of Fig. 6;

Fig. 7 is a diagrammatic view showing an alternative means for deriving three separate component signals from a single symbol generating tube;

Fig. 8 is a view of still another alternative embodiment for deriving three separate component signals from a single symbol generating tube;

Fig. 8A is an enlarged view of a modified form of screen and mask structure employed in the embodiment of Fig. 8; and Fig. 9 is a view of a screen and/or mask configuration employing multiple columns of beam traceable tracks.

Figure 1:
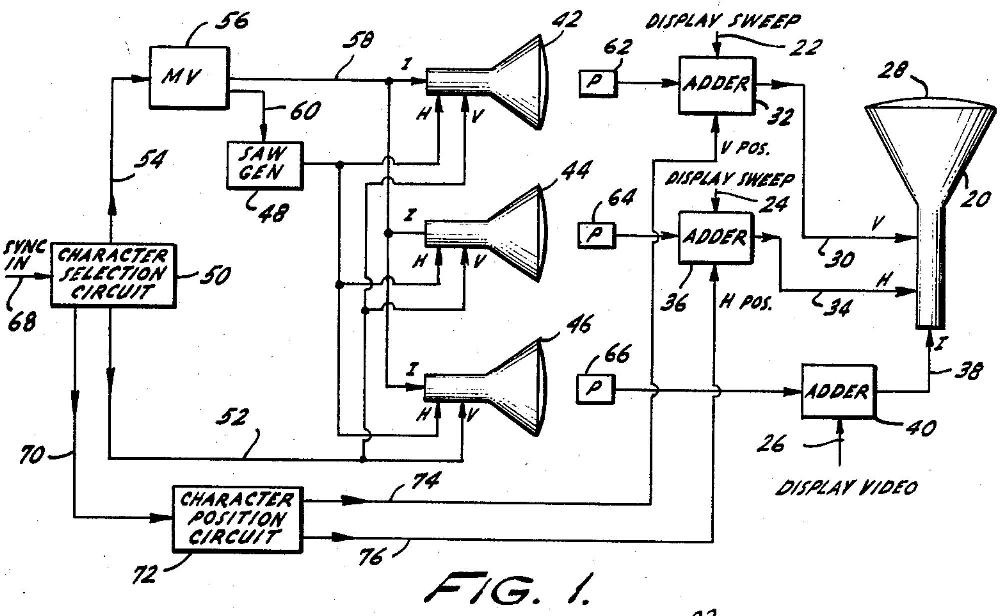
Fig. 1 is a block diagram of one preferred embodiment of the present invention employing three separate signal component generators.

In Fig. 1 the display cathode ray tube is shown at 20. The area display including both target indications and the identifying symbols appears on the screen 28 of display tube 20. In the description that follows it will be assumed that both the target indications and the identifying symbols are in the form of an intensity modulated area display generated by two orthogonally related deflection means, for example horizontal deflection means and vertical deflection means. With this arrangement the formation of the target display is similar to the formation of a television image. The identifying symbols are formed by a continuous tracing of the beam in a manner which will be described in more detail presently.

Arrow 22 in Fig. 1 represents the source of vertical deflection signals for the target display which is supplied to the vertical deflection means 30 of display tube 20 by way of an adder circuit 32. Similarly arrow 24 represents the source of horizontal deflection signals for the target display which is supplied to the horizontal deflection means 34 of tube 20 through an adder circuit 36. Vertical deflection means 30 and horizontal deflection means 34 are illustrated in Fig. 1 only by means of arrows but it should be understood that they comprise electrostatic deflection plates, magnetic deflection coils or other known means for deflecting the cathode ray beam. Arrow 26 represents a source of target video information which is supplied to the intensity control 38 of tube 20 through an adder circuit 40. Control 38 may be the cathode or control grid of display tube 20.

The symbol generating circuit per se of Fig. 1 comprises three symbol generating tubes 42, 44 and 46. As will be seen presently, tube 42 provides vertical deflection information for a plurality of different symbols, tube 44 provides horizontal deflection information and tube 46 provides intensity information for a like plurality of symbols. Tubes 42, 44 and 46 are provided with vertical beam deflection means and horizontal beam deflection means which may be either electrostatic deflection plates or suitable deflection coils. These three tubes are also provided with a beam intensity control means such as a control grid.

A sawtooth generator circuit 48 supplies the same horizontal deflection signal to the horizontal deflection controls of all three tubes 42, 44 and 46. A character selection circuit 50 supplies a step waveform to the vertical deflection controls of all three tubes 42, 44 and 46 by way of connection 52. In its simplest form, character selection circuit 50 may comprise a manually-operable, stepped voltage divider which provides a selectable D.C. output voltage in response to the movement of a control. The various positions that the control may assume may be identified by index symbols corresponding to the symbols that will be generated on the display tube 20 for the corresponding positions of the control. Higher speed systems will be similar in principle but will employ suitable computer circuits to select the desired symbol and provide the necessary stepped voltage wave. Character selection circuit 50 also supplies a synchronizing signal by way of connection 54 to a multivibrator circuit 56. This synchronizing signal may be derived directly from an input synchronizing connection 68 which will be explained in more detail presently.

Multivibrator 56 supplies an intensifying pulse to the intensity controls of cathode ray tubes 42, 44 and 46 by way of connection 58. It also supplies a control pulse to sawtooth generator 48 by way of connection 60 which initiates the generation of the sawtooth deflection signal provided by generator 48.

Photoelectric devices 62, 64 and 66 are positioned to intercept the luminous energy radiated from the screens of cathode ray tubes 42, 44 and 46, respectively. The terms "luminous" and "light" as used herein are to be construed as including infrared and ultraviolet radiations which, while not visible to the human eye, are susceptible of detection by photoelectric devices. Photoelectric devices 62, 64 and 66 supply electrical signals representative of this light output to adder circuits 32, 36 and 40, respectively. Photoelectric devices 62, 64 and 66 may comprise photomultiplier tubes with or without suitable lens systems for concentrating the light output of the symbol generating tubes 42, 44 and 46 on the light sensitive element of the photomultiplier tube. Photoelectric devices 62, 64 and 66 and/or adder circuits 32, 36 and 40 may include amplifier stages with or without gain controls if require to provide electrical output signals at desired average amplitude levels.

Means (not shown in Fig. 1) supplies synchronizing signals to input 68 so that the signals supplied by photomultipliers 62, 64 and 66 occur at different times than the signals supplied by sources represented by arrows 22, 24 and 26. For example, one or more character initiating pulses may be supplied at input lead 68 following each complete raster on display tube 20 to cause one or more symbols to be written on the screen 28 before the next raster begins.

Character selection circuit 50 also supplies a synchronizing signal by way of connection 70 to a character position circuit 72 which provides horizontal and vertical position voltages for placing the symbols generated at the desired place on the screen of the cathode ray tube 28. Again these synchronizing signals may be derived directly from the synchronizing signals supplied at input 68. The vertical position voltage is supplied by way of lead 74 to adder 32 and the horizontal deflection voltage is supplied by way of lead 76 to adder 36. As mentioned above the character position circuit 72 forms no part of the present invention and therefore will not be described in detail. However a brief comment on the forms this circuit may assume is included in order that the features and advantages of the present invention may be more fully appreciated. In its preferred form the character position circuit 72 will comprise means for automatically generating electrical signals which are proportional in amplitude to the horizontal and vertical coordinates of a selected target indication on the screen 28 of display tube 20. The amplitudes of the generated electrical signal will change as the position of the target indication changes. Means will also be provided for initially locking the system to a desired target indication. Preferably the character position circuit 72 will include means for tracking more than one target at a time, the signals representing each target being supplied to the display tube in time coincidence with the corresponding symbol generating signals through pulse operated gate circuits or the like. However, in a simpler form which is adequate to illustrate the operation of the present invention circuit 72 may comprise simply first and second continuously variable voltage dividers connected to a suitable source of deflection potential. The outputs of the two voltage dividers are connected through suitable signal actuated gate means to leads 74 and 76, respectively. The signal actuated gates connect the potentiometers to the adder circuits 32 and 36 only during those intervals in which a symbol is to be generated. Input 70 provides the signals for actuating the gate means.

Figure 3:
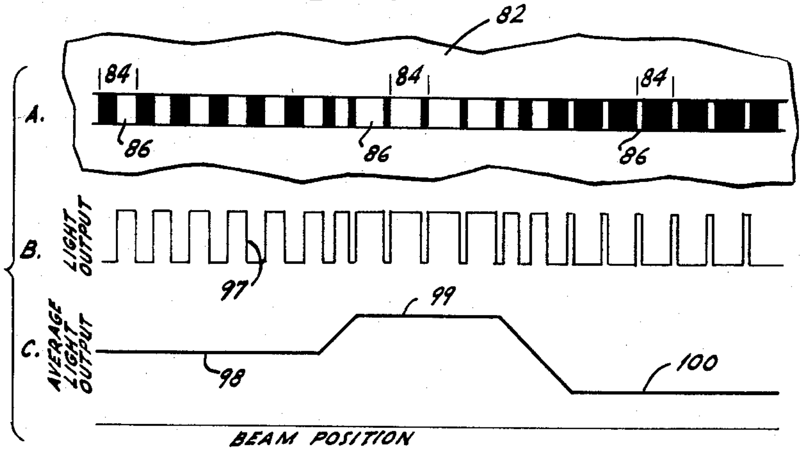
Fig. 3 is a composite representation which includes an enlarged view of one of the beam traceable tracks appearing on the screen of Fig. 2 and the output signals which may be derived from this track.
Figure 2:
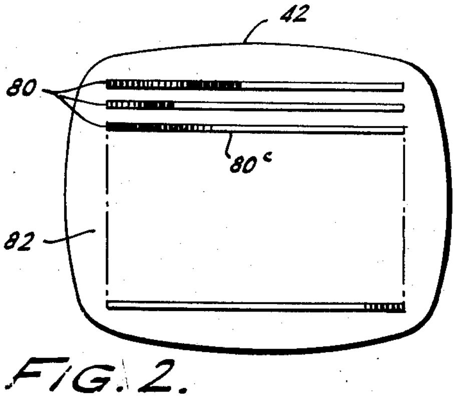
Fig. 2 is a diagrammatic showing of the screen of one of the signal generating tubes employed in the system of Fig. 1.

The screen structure of the symbol generating cathode ray tubes 42, 44 and 46 is shown in Figs. 2 and 3. Since all three tubes 42, 44 and 46 are alike except for the information stored in the beam traceable tracks, only one tube 42 will be described. As shown in Fig. 2, a plurality of beam traceable tracks 80 are disposed horizontally on the face 82 of the symbol generating cathode ray tube 42. Each track 80 represents the horizontal component of a different symbol. Thirty or more tracks may be stacked vertically on the screen of a five-inch cathode ray tube without imposing impractical limits on the track selection voltage supplied by circuit 50.

Tracks 80 are so constructed that the light output therefrom varies from point to point along each track in accordance with the desired variation in the signal component to be generated by that track. This variation in light output may be accomplished by changing the characteristics of the phosphor along the track in accordance with the desired variation in output signal. An alternative means which is more readily achieved in practice is to deposit the phosphor in bars of varying widths along the track to provide the desired variation in light output. This is accomplished by subdividing tracks 80 into segments 84 as shown at A in Fig. 3 and coating only a portion 86 of each segment 84 with phosphor. The phosphor-to-black ratio (i.e. the phosphor-to-no phosphor ratio) of each segment 84 is varied to vary the average signal output from the track as it is scanned by a constant intensity beam. The number of segments 84 in the track should be selected so that the modulation frequency of the output signal resulting from the subdividing of tracks 80 into segments 84 is much higher than the highest frequency component necessary for the faithful reproduction of the most complex symbol to be generated by the symbol generating tube.

Figure 1A:
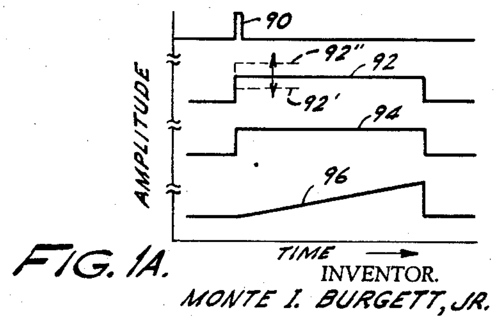
Fig. 1A is a plot showing the time relationship of certain signals present at various points in the system of Fig. 1.

The symbol generating system shown in Figs. 1, 2 and 3 operates in the following manner to generate a symbol on the screen 28 of display cathode ray tube 20. Character selection circuit 50 supplies an initiating pulse, shown as pulse 90 in Fig. 1A, to the multivibrator 56. At the same time character selection circuit 50 supplies a vertical position signal shown at 92 in Fig. 1A to the vertical deflection controls of the symbol generating cathode ray tubes 42, 44 and 46. The amplitude of the vertical selection voltage 92 is selected by circuit 50 so that the beams of symbol generating cathode ray tubes 42, 44 and 46 are each deflected to a selected beam traceable track such as track $80^c$ on the screen thereof. As shown in Fig. 1A the amplitude of selection voltage 92 is variable to other values such as 92′ and 92″ to select different tracks on the screen of the symbol generating tubes 42, 44 and 46, thereby to generate different symbols on the display tube 28.

Multivibrator 56 generates an intensifying signal such as signal 94 of Fig. 1A. This intensifying signal is supplied to the control electrodes of the symbol generating cathode ray tubes 42, 44 and 46. The beams of these three cathode ray tubes are normally biased off but are turned on by the intensifying signal 94.

The signal supplied by multivibrator 56 to sawtooth generator 48 by way of connection 60 may be a pulse as shown at 90 in Fig. 1A or an enabling gate similar to waveform 94 in Fig. 1A. Sawtooth generator circuit 48 responds to the signal supplied thereto to generate a sawtooth waveform as shown at 96 in Fig. 1A. This sawtooth waveform is supplied to the horizontal deflection control of cathode ray tubes 42, 44 and 46. Thus the beams of these three symbols generating cathode ray tubes are deflected in synchronism along the selected beam traceable track of each tube.

If the phosphor employed in the beam traceable tracks on the screen of the symbol generator tubes 42, 44 and 46 has a very short persistence, the light output from each tube will be a series of light pulses of the same peak intensity but variable duration. Waveform B in Fig. 3 is a plot of light output as a function of beam position. The pulses 97 of waveform B are of uniform height and repetition frequency. However pulses 97 vary in width with changes in the phosphor-to-black ratio of the track 80 which produces them.

The time versus amplitude waveform for the light output of tube 42 will be identical to that shown at B in Fig. 3 provided the beam is caused to scan along the track 80 at a uniform rate. By substituting a phosphor having a decay time which is long compared to the repetition period of the pulses 97, or by placing suitable integrating circuits in the photomultiplier tubes 62, 64 and 66 which respond to the light supplied by cathode ray tubes 42, 44 and 46, an output signal such as the waveform shown at C in Fig. 3 is obtained. It will be understood that while the delay time may be long compared to the repetition period of pulses 97 it must be short compared to the useful variations in signal amplitude as represented by portions 98, 99 and 100 in Fig. 3*c*. Portion 98 of the curve of the waveform shown at C represents a phosphor-to-black ratio of one-to-one, that is with one-half the segment 84 taken up with a phosphor. Portion 99 represents a phosphor-to-black ratio which is much greater than one and portion 100 represents a phosphor-to-black ratio of much less than one. A phosphor such as Du Pont phosphor Q59–2929, which has a very short delay time, makes it possible to scan an entire line on the character generating tubes 42, 44 and 46 in one microsecond or less. Screen 28 of display tube 20 may employ a longer persistence phosphor so that the symbols remain visible for the desired length of time.

As the cathode ray beams sweep in synchronism over the selected beam traceable track on each tube the variable light received by photomultiplier tube 62 results in the generation of the vertical deflection voltage necessary to produce a selected symbol on the screen 28 of the display tube 20. Similarly the variations in the selected beam traceable tracks on symbol generator tubes 44 and 46 are such that the variable light signals falling on photomultiplier tubes 64 and 66 result in the generation of corresponding horizontal deflection signals and intensity modulation signals for the same symbol. The size of the symbol appearing on the screen 28 of display tube 20 will depend upon the amplitude of the signals provided by photomultiplier tubes 62 and 64. The brightness of the symbol will depend upon the amplitude of the signal supplied by photomultiplier tube 66. Suitable gain control means may be incorporated in photomultiplier tubes 62, 64 and 66 or in amplifiers associated therewith for controlling the size and brightness of the symbols. The same result can be obtained by controlling the intensity of the cathode ray beams of tubes 42, 44 and 46.

To further illustrate the operation of the system of Fig. 1 the three signals necessary to write the letter P are shown in Fig. 4. Waveform A in Fig. 4 represents the horizontal deflection voltage necessary to form the letter P. Waveforms B and C represent the vertical deflection voltage and the intensifying voltage, respectively, necessary to form the letter P. As shown in Fig. 4, the letter P is traced from the bottom of the upright portion 101 to the top thereof and then around the loop 103 in a clockwise direction to a point at the middle portion of the upright 101. During the tracing of the upright portion 101 the horizontal deflection component remains constant as shown at $101^a$ in waveform A. At the same time the amplitude of the component represented by waveform B rises at a constant rate as shown at $101^b$ to produce the upward motion of the beam. To trace the loop 103 the horizontal deflection component first rises and then falls as shown at $103^a$ in waveform A to produce first a deflection of the beam to the right and then a return to the initial horizontal position. The vertical deflection component necessary to trace the loop 103 first remains constant, then falls and finally remains constant again as shown at $103^b$ in waveform B. Since the letter P can be traced in one continuous motion of the beam, the intensifying signal shown at C in Fig. 4 comprises a single pedestal 104.

Complex symbols such as the letters E and F can be formed with one stroke of the writing beam by retracing certain parts of the letter. However it is preferable to form such letters with more than one strike of the beam. In generating complex symbols formed of more than one stroke, waveform C of Fig. 4 would comprise a series of pedestals with blank spaces therebetween for blanking the beam as it moves from the end of one writing stroke to the beginning of the next. Since the intensity control signals will be a series of constant amplitude pedestals which turn the beam on or off, the phosphor may be laid down on the screen of tube 46 in continuous lines representing each pedestal rather than breaking each pedestal into segments 84 as shown in Fig. 3. If the symbols to be employed can all be formed with single strokes of the writing beam, the cathode ray tube 46 which provides the intensity control signal may be dispensed with and an intensifying signal supplied to display tube 20 from multivibrator 56.

The beam traceable tracks for any arbitrary signal may be formed by first determining the stroke or strokes necessary to form the symbol and then graphically determining the deflection signals necessary to produce these strokes. That is, a plot such as shown in Fig. 3C is first made by analyzing the symbol graphically. The phosphor track is then laid down with variations in the phosphor-to-black ratio corresponding to the desired variations in amplitude of the deflection signals. Variation in the phosphor-to-black ratio in increments as small as 5% are readily achieved in production. In general, each symbol written on screen 28 of display tube 20 will be very small compared to the total area of screen 28. Typical dimensions might be of the order of 1/50 the horizontal and vertical dimensions, respectively, of the screen 28. The position on screen 28 at which the symbol is written is determined by the positioning potentials supplied by way of leads 74 and 76. These positioning potentials are in the nature of a D.C. biasing signal on which the smaller-amplitude, time-variant signals representing the symbols are superimposed. The very high speed at which a symbol may be generated, the large number of symbols components which may be generated by a single character generator tube and the ease and speed at which the cathode ray beam may be switched from one beam traceable track to another makes it possible to generate all necessary characters for a complex display on one set of symbol generating tubes 42, 44 and 46.

In describing the system of Fig. 1 it has been assumed that symbol generator tubes 42, 44 and 46 are each provided with the same number of beam traceable tracks and that, if the beam is deflected to the *n*th track on tube 42 by the signal supplied by character selection circuit 50, then the beams of tubes 44 and 46 will likewise be deflected to the *n*th tracks on these tubes. Certain economies may be achieved by employing the same horizontal and vertical deflection signals but different intensifying signals to generate two or more different symbols. For example the letter R may be converted to the letter P merely by blanking out the beam on the display tube 20 when the shorter leg is being traced. Similarly the letters I, E, L and F may be traced using the same deflection components but different intensifying components. If different tracks are to be selected on symbol generator tubes 42, 44 and 46, separate vertical positioning leads 52 from the character selection circuits 50 to the symbol generating tubes 42, 44 and 46 must be provided. Any desired combination of positioning voltages may be obtained by substituting a tapped voltage source and a multideck, multiposition switch for the stepped voltage divider which was suggested as one typical embodiment of the block 50. Higher speed systems may employ suitable signal actuated gate circuits for accomplishing the same result.

Fig. 5 illustrates an alternative method of generating a variable amplitude signal representing one deflection component or the intensity component of the symbol to be generated. Cathode ray tube 110 in Fig. 5 corresponds to any one of the cathode ray tubes 42, 44 and 46 of Fig. 1. The horizontal deflection control, the vertical deflection control and the intensity control of cathode ray tube 110 may be supplied with signals from sawtooth generator 48, character selection circuit 50 and multivibrator 56, respectively, as in Fig. 1. Cathode ray tube 110 may have a uniform phosphor screen such as that employed in cathode ray oscilloscopes and in black and white television picture tubes. A mask 112 is provided in front of the screen of cathode ray tube 110. A photocell or photomultiplier tube 114 is provided for converting the light passing through mask 112 to an electrical signal.

Fig. 5A is a front view of the mask 112 showing the beam traceable tracks 116 formed thereon. The tracks 116 may comprise alternately positioned transparent and opaque areas as shown in Fig. 3 or they may be formed with areas of varying density. Mask 112 may be formed by first forming a large size black and white master and then photographing this master to provide a mask with variable density tracks. As in Fig. 1 each beam traceable track 116 represents a different symbol. The placing of the beam traceable tracks on the mask 112 instead of the screen of the cathode ray tube 110 permits an unlimited selection of symbols simply by changing the masks 112. It should be obvious to those skilled in the art that one, two, or all three of the cathode ray tubes 42, 44 and 46 of Fig. 1 may be replaced by a combination of cathode ray tube 110 and mask 112 as shown in Fig. 5 without altering the operation of the present invention.

As an alternative embodiment of the invention the screen of a symbol generator tube similar to tube 110 of Fig. 5 but without the mask 112 may be provided with beam traceable tracks 80 formed of a material having a secondary emission ratio other than one. A conductive band 117 is provided on the inside of the envelope of the tube 110 for collecting the secondary electrons liberated from the beam traceable tracks. Band 117 is connected through a load impedance 118 to a suitable source of positive biasing potential represented by the plus sign in Fig. 5. The signal appearing across resistor 118 will represent the variations in the secondary emission characteristic from point to point along the beam traceable track. The secondary emission type track may be employed in place of the luminous phosphor track or a secondary emission type track may be superimposed on a luminous phosphor type track to provide two different information signals for one scan of the cathode ray beam.

Figs. 6 and 6A together illustrate another means for deriving information relating to two or more components of the symbol to be generated from the same cathode ray tube. The single cathode ray tube 120 of Fig. 6 may be employed in place of two or more of the cathode ray tubes 42, 44 or 46 in Fig. 1. As shown in Fig. 6A, the screen of cathode ray tube 110 is provided with a series of track groups 122. Each track group is made up of two or more beam traceable tracks, for example tracks 122ᵃ, 122ᵇ and 122ᶜ. Each of the tracks within a group is formed of a differently colored phosphor such as the red, green and bule phosphors employed in color television tubes. The vertical dimension of the beam of cathode ray tube 120 is such that the beam impinges on all three tracks of one track group at the same time. An eliptical beam such as is represented by the broken line 124 in Fig. 6A is preferred since it provides good resolution in the horizontal direction. Three photocells or photomultiplier tubes 126, 128 and 130 are provided for intercepting the light emanating from the screen of cathode ray tube 120. Monochromatic filters 132, 134 and 136 are positioned between the phototubes 126, 128 and 130 and the screen of cathode ray tube 120. The monochromatic filters are chosen to correspond to the colors of the phosphor tracks within each track group. If filter 132 is a red filter, phototube 126 will respond only to the variations in the red phosphor track 122ᵃ in the selected track group 122. Similarly phototube 128 will respond only to the green phosphor track 122ᵇ and phototube 130 will respond only to the blue phosphor track 122ᶜ. It is believed that the modification shown in Fig. 6 requires no further description. The single cathode ray tube 120 may be substituted for the three cathode ray tubes 42, 44 and 46. Since the horizontal controls, the vertical controls and the intensity controls of cathode ray tubes 42, 44 and 46 in Fig. 1 are all energized in parallel, the substitution of the single cathode ray tube 120 for the three tubes shown in Fig. 1 requires no change in circuitry. Phototubes 126, 128 and 130 of Fig. 6 replace phototubes 62, 64 and 66, respectively, of Fig. 1. As an alternative measure a multicolored mask may be employed in place of the multicolored phosphor tracks.

Fig. 7 illustrates still another modification of the system of Fig. 1 in which three components of the signal are derived from a single cathode ray tube 140. Again cathode ray tube 140 may have a uniform phosphor screen. The masks 142, 144 and 146 are provided in front of the screen of cathode ray tube 140 for modulating the light output as the beam of cathode ray tube 140 is deflected in one direction. Each of the masks 142, 144 and 146 may be similar to the mask 112 shown in Fig. 5A. Lens systems 148, 150 and 152 may be provided for imaging the trace appearing on the screen of cathode ray tube 140 on a selected one of the beam traceable tracks on masks 142, 144 and 146. The lens systems are such that the bright trace on the screen of cathode ray tube 140 is imaged on a single beam traceable track on each of the masks 142, 144 and 146. Phototubes 154, 156 and 158 perform the functions of phototubes 62, 64 and 66 of Fig. 1.

Figs. 8 and 8A illustrate still another modification of the system of Fig. 1 in which two or more signal components are derived from the same cathode ray tube. The cathode ray tube 160 of Fig. 8 is provided with a screen having a plurality of beam scannable track groups as shown in Fig. 6A. However the tracks employed on cathode ray tube 160 may all be formed of the same phosphor. Alternatively tube 160 may have a plain phosphor screen with the beam traceable tracks formed on a suitable mask (not shown) placed between the screen of tube 160 and the phototube 162. A mask 164 is disposed between the screen of tube 160 and phototube 162. Screen 164 is shown in more detail in Fig. 8A. Mask 164 has a plurality of beam traceable tracks which register with the beam traceable tracks on the screen of cathode rab tube 160, or the first-mentioned mask if it is used. Each track within a selected track group 166 is composed of alternate bands of different density. Alternate bands of opaque and transparent areas are assumed in the illustration of Fig. 8A but a sinusoidal variation or other periodic variation in intensity may be substituted therefor. The period of the variation in track 168, for example, of the selected track group 166 is different from that of tracks 170 and 172. The function of tracks 168, 170 and 172 is to impress a high frequency modulation on the light received by the phototube 162. Thus the total signal received by phototube 162 will be made up of three components. A first component is modulated by the variations in intensity of the track 122$^a$ on the screen of cathode ray tube 160 and the track 168 on mask 164. A second component is modulated by the variations in track 122$^b$ and the variations in track 170 on mask 164. The third component is modulated by the variations in tracks 122$^c$ and track 172. The variations in tracks 168, 170 and 172 should be of a much higher frequency than the variations in the information tracks 122$^a$, 122$^b$ and 122$^c$ on the screen of cathode ray tube 160. If each beam traceable track is scanned in a few microseconds or less the modulating frequencies generated by tracks 168, 170 and 172 will be in the range of several megacycles to several hundred megacycles per second. The output circuit of phototube 162 is provided with a series of tuned circuits 180, 182 and 184 which have resonant frequencies corresponding to the modulating frequencies impressed by tracks 168, 170 and 172, respectively. The signal supplied to secondary winding 186 which is coupled to tuned circuit 180 will be the information signal appearing on track 122$^a$ modulated by the carrier frequency impressed by track 168. The carrier frequency component may be removed from the signal appearing at secondary winding 186 by suitable integrating or detecting means coupled to secondary winding 186. The detected or integrated signal is the desired deflection signal for the display cathode ray tube 20. Similarly the signals appearing at secondary windings 188 and 190 will correspond to the signals appearing on information tracks 122$^b$ and 122$^c$.

In the foregoing examples it has been assumed that each beam traceable track extends the entire width of the cathode ray tube screen. In some embodiments of the invention it may be desirable to place a greater number of symbols on the screen of the cathode ray tube than can be accommodated in one vertical column. Therefore it is possible to form the beam traceable tracks in two or more vertical columns as shown at 192 and 194 in Fig. 9. Selection of a desired beam traceable track may be accomplished by applying both a vertical step voltage to select a desired track in a column and a horizontal step voltage to select a desired column. This will require the addition of a second connection from character selection circuit 50 to the horizontal deflection controls of symbol generator tubes 42, 44 and 46. However the addition of this connection is well within the capabilities of the skilled worker in the art.

As an alternative, the beam of the symbol generator tube may have a rest position at the center of the screen. A positive going sawtooth horizontal sweep signal may be provided to cause the beam to sweep a selected track in column 194 while a negative going sawtooth horizontal sweep signal may be provided to cause the beam to sweep a selected track in column 192.

In all of the embodiments of the invention illustrated in the drawings the beam traceable tracks have been shown as straight lines. It is obvious that tracks of other shapes such as circular may be provided without departing from the invention. The linear tracks are preferred however because of the ease in selecting and scanning such a track.

It has been assumed in the foregoing description of the invention that the target display signals and the signals representing the symbols to be displayed are supplied to the same deflection controls on display tube 20. It lies within the scope of the present invention to provide two separate sets of deflection controls for the same beam. These two controls would be operated on a time sharing basis as explained above. It also lies within the scope of the invention to provide a display tube having a plurality of electron guns each with its own deflection and intensity controls so that the target displays and one or more symbol displays may be generated simultaneously.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What I claim is:

1. A symbol generating system for cathode ray tube displays which comprises means including a screen responsive to the impingement thereon of a cathode ray beam for generating an electrical signal, said means being formed with a plurality of beam traceable tracks, the amplitude response of said means to a cathode ray beam of selected intensity varying from point to point along each track in accordance with the variation in amplitude of a selected component signal of a symbol to be generated, the amplitude response of said means to a cathode ray beam of selected intensity being substantially constant for transverse displacements of said beam within the limits of said track, means for generating a cathode ray beam, first deflecting means for deflecting said beam to coincide with a selected one of said beam traceable tracks, and second beam deflecting means for deflecting said cathode ray beam along the selected track at a predetermined rate.

2. A symbol generating system for cathode ray tube displays which comprises means including a screen responsive to the impingement thereon of a cathode ray beam for generating an electrical signal, said screen being formed with a plurality of beam traceable tracks, the secondary emission ratio of said screen in response to a cathode ray beam of selected intensity varying from point to point along each track in accordance with the variation of the amplitude of a selected component signal of a symbol to be generated, the secondary emission ratio of said screen in response to a cathode ray beam of selected intensity being substantially constant in a direction transverse to said track within the limits of said track, means for generating a cathode ray beam, first deflecting means for deflecting said beam to coincide with a selected one of said beam traceable tracks, and second beam deflecting means for deflecting said cathode ray beam along a selected track at a predetermined rate.

3. A symbol generating system for cathode ray tube displays which comprises means including a screen responsive to the impingement thereon of a cathode ray beam for generating a luminous signal, said means being formed with a plurality of beam traceable tracks, the luminous response of said means to a cathode ray beam of selected intensity varying in intensity from point to point along each track in accordance with the variation of the amplitude of a selected component signal of a symbol to be generated, the luminous intensity of said means to a cathode ray beam of selected intensity being substantially constant for transverse displacements of said beam within the limits of said track, means for generating a cathode ray beam, first deflecting means for deflecting said beam to coincide with a selected one of said beam traceable tracks, second beam deflecting means for deflecting said cathode ray beam along a selected track at a predetermined rate, and means responsive to the luminous signal provided by said means including said screen for providing an electrical signal having an instantaneous amplitude representative of selected variations in the amplitude of said luminous signal.

4. A symbol generating system in accordance with claim 3 wherein said beam traceable tracks are formed on said screen, the luminous response of said screen to a cathode ray beam of selected intensity varying in intensity from point to point along each track and being substantially constant in a transverse direction within the limits of said track.

5. A symbal generating system in accordance with claim 3 wherein said first-mentioned means includes a mask disposed between said screen and said last-mentioned means, the density of said mask varying from point to point along each track and being substantially constant in a transverse direction within the limits of said track.

6. A symbol generating system in accordance with claim 3 wherein said first-mentioned means includes a mask disposed between said screen and said last-mentioned means, the density of said mask varying from point to point along each track in accordance with the variation of the amplitude of a selected signal component of a symbol to be generated, the density of said mask being substantially uniform in a direction transverse to said track within the limits of said track.

7. A symbol generating system for cathode ray tube displays which comprises a plurality of signal component generators, each of said signal component generators comprising means including a screen responsive to the impingement thereon of a cathode ray beam for generating an electrical signal, said means being formed with a plurality of beam traceable tracks, the amplitude response of said means to a cathode ray beam of selected intensity varying from point to point along each track in accordance with the varition in amplitude of a selected component signal of a symbol to be generated, the amplitude response of said means to a cathode ray beam of selected intensity being substantially constant for displacement of said beam transverse to said track within the limits of said track, means for generating a cathode ray beam, first signal responsive deflecting means for deflecting said beam to coincide with a selected one of said beam traceable tracks, and second signal responsive beam deflecting means for deflecting said cathode ray beam along the selected track at a predetermined rate, said symbol generating system further comprising means for supplying a signal of selected amplitude to said first deflecting means in each of said signal component generators thereby to cause said cathode ray beam to be deflected to a selected one of said tracks in each of said generators, means for supplying a scanning signal to said second deflecting means in each of said signal component generators thereby to cause the beams in said plurality of signal component generators to be deflected in synchronism along the selected tracks, and means for supplying the electrical signal provided by said first mentioned means in each of said signal component generators to a display tube.

8. A symbol generating system for cathode ray tube displays which comprises a plurality of signal component generators, one of said signal component generators providing an electrical signal representing one orthographic deflection signal of the symbol to be displayed, a second one of said signal component generators providing an electrical signal representing a second orthographic deflection signal of the symbol to be displayed, each of said signal component generators comprising means including a screen responsive to the impingement thereof of a cathode ray beom for generating an electrical signal, said means being formed with a plurality of beam traceable tracks, the amplitude response of said means to a cathode ray beam of selected intensity varying from point to point along each track in accordance with the variation of that component of the symbol to be displayed which is supplied by that signal component generator, means for generating a cathode ray beam, the amplitude response of said means to a cathode ray beam of selected intensity being substantially constant for displacements of said beam transverse to said track within the limits of said track, first signal responsive deflecting means for deflecting said beam to coincide with a selected one of said beam traceable tracks, and second signal responsive beam deflecting means for deflecting said cathode ray beam along a selected track, said symbol generating system further comprising means for supplying a signal of selected amplitude to said first deflecting means in each of said signal component generators thereby to cause said cathode ray beam in each of said generators to be deflected to a selected one of said tracks, means for supplying a scanning signal to said second deflecting means in each of said signal component generators thereby to cause the beam in each of said plurality of generators to be deflected in synchronism along the selected tracks, at a predetermined rate, a display tube having first and second orthographic beam deflection means, means for supplying electrical signal provided by said first signal component generator to said first orthographic deflection means and means for supplying said electrical signal supplied by said second one of said signal component generators to said second one of said orthographic beam deflecting means.

9. A symbol generating system in accordance with claim 8 wherein a third one of said signal component generators provides an electrical signal representing the intensity modulation of the symbol to be displayed, and means for supplying the electrical signal provided by said third signal component generator to the intensity control of said display tube.

10. A symbol generating system for cathode ray tube displays which comprises means including a screen responsive to the impingement thereon of a cathode ray beam for generating a luminous signal, said means being formed with a plurality of beam traceable track groups, each of said track groups including a plurality of juxtaposed beam traceable tracks, the luminous response of each track to a cathode ray beam of selected intensity varying in intensity from point to point along that track in accordance with the variation in amplitude of a selected component signal of a symbol to be generated, the luminous response of each track to a cathode ray beam of selected intensity being substantially constant for displacements of said beam in a direction transverse to said track within the limits of said track, each track within a given track group representing a different component signal of the symbol represented by that track group, means for generating a cathode ray beam, first signal responsive deflecting means for deflecting said cathode ray beam into simultaneous impingement with all tracks of a selected track group, second signal responsive deflecting means for deflecting said cathode ray beam along a selected track group at a predetermined rate, and means responsive to the luminous signal provided by said means including said screen for providing at separate outputs electrical signals representative of selected variations in the luminous signals provided by each of said tracks within said selected track group.

11. A symbol generating system in accordance with claim 10 wherein each track within a selected track group provides a luminous signal of a wavelength different from the wavelengths of the luminous signals provided by other tracks within that track group.

12. A symbol generating system in accordance with claim 10 wherein each track within a selected track group provides a luminous signal of a wavelength different from the wavelengths of the luminous signals provided by other tracks within that track group, said last-mentioned means of claim 10 comprising a plurality of individual means each responsive only to a luminous signal of the wavelength provided by a corresponding one of said tracks for providing an electrical signal representative of selected variations in the intensity of the luminous signal provided by said corresponding track.

13. A symbol generating system in accordance with claim 10 wherein the luminous response of each track to a cathode ray beam of selected intensity varies in intensity from point to point along that track in accordance with the variation in amplitude of a selected component signal of a symbol to be generated and further varies in intensity at a selected rate which is high compared to said first mentioned variation in intensity, said last-mentioned rate being different for each track within a selected track group.

14. A symbol generating means in accordance with claim 10 wherein said last-mentioned means comprises optical means for separating the luminous indication provided by the selected track group into separate luminous signals representing the luminous signals contributed by individual tracks within the selected track group, and a plurality of means each responsive to a corresponding one of said separate luminous signals for providing an electrical signal representative of selected variations in the amplitude of that luminous signal.

15. A symbol generating system for cathode ray tube displays which comprises means for generating a cathode ray beam, a target for said cathode ray beam, said target including a plurality of beam traceable tracks, each of said tracks being formed of alternate transverse bands having, respectively, a first and a second characteristic, bands having said first characteristic being responsive to the impingement thereon of said cathode ray beam to emit electromagnetic radiation, bands having said second characteristic being effectively insensitive to the impingement thereon of said cathode ray beam, the response of each of said bands being substantially constant for displacements of said beam in a direction transverse to said track within the limits of said track, said bands varying in the dimension measured along said track, from point to point along each track, in accordance with the variation in the amplitude of a selected component signal of a symbol to be generated, first deflecting means for deflecting and cathode ray beam to coincide with a selected one of said beam traceable tracks, second beam deflecting means for deflecting said cathode ray beam along a selected track at a predetermined rate, and means responsive to the electromagnetic radiations of said target for providing an electrical signal representative of the variations in intensity of said radiations.

16. A symbol generating system as in claim 15 wherein the number of transverse bands per unit length of track is different for different tracks.

17. A symbol generating system as in claim 15 wherein said tracks are arranged in groups of more than one track each, said cathode ray beam having a width sufficient to impinge on all tracks of a group simultaneously, and wherein the number of transverse bands per unit length of track is different for each track within a track group.

18. A symbol generating system as in claim 15 wherein said target comprises a screen having electron sensitive material disposed only in said bands having said first characteristic within the limits of said tracks.

19. A symbol generating system as in claim 15 wherein said target comprises a screen coated with electron sensitive material and a mask disposed adjacent said screen on which said tracks are formed of alternate transparent and opaque areas.

20. A symbol generating system for cathode ray tube displays which comprises means including a screen responsive to the impingement thereon of a cathode ray beam for generating a luminous signal, said means further including a mask disposed adjacent said screen, said mask being formed with plurality of beam traceable tracks, each of said tracks including alternate transparent and opaque areas, said areas having a uniform dimension in a direction transverse to said track and varying in the dimension measured parallel to said track from point to point along said track in accordance with the variation of the amplitude of a selected component signal of the symbol to be generated, means for generating a cathode ray beam, first deflecting means for deflecting said beam to coincide with said screen in the region corresponding to a selected one of said beam traceable tracks on said mask, second beam deflecting means for deflecting said cathode ray beam along said screen parallel to said selected track on said mask, and means responsive to a luminous signal passing through said mask for deriving an electrical signal having an instantaneous amplitude representative of selected variations in the amplitude of said luminous signal.

References Cited in the file of this patent

UNITED STATES PATENTS

| | | |
|---|---|---|
| 2,402,989 | Dickinson | July 2, 1946 |
| 2,624,798 | Dinga | Jan. 6, 1953 |
| 2,652,514 | Davison | Sept. 15, 1953 |
| 2,750,532 | Samuel | June 12, 1956 |
| 2,816,159 | Thomas | Dec. 10, 1957 |
| 2,841,740 | Bland | July 1, 1958 |
| 2,868,870 | Goldmark | Jan. 13, 1959 |